Dec. 24, 1929. A. R. BLEWETT 1,740,723
FEEDER CONSTRUCTION FOR HARVESTER THRASHERS
Filed March 19, 1928
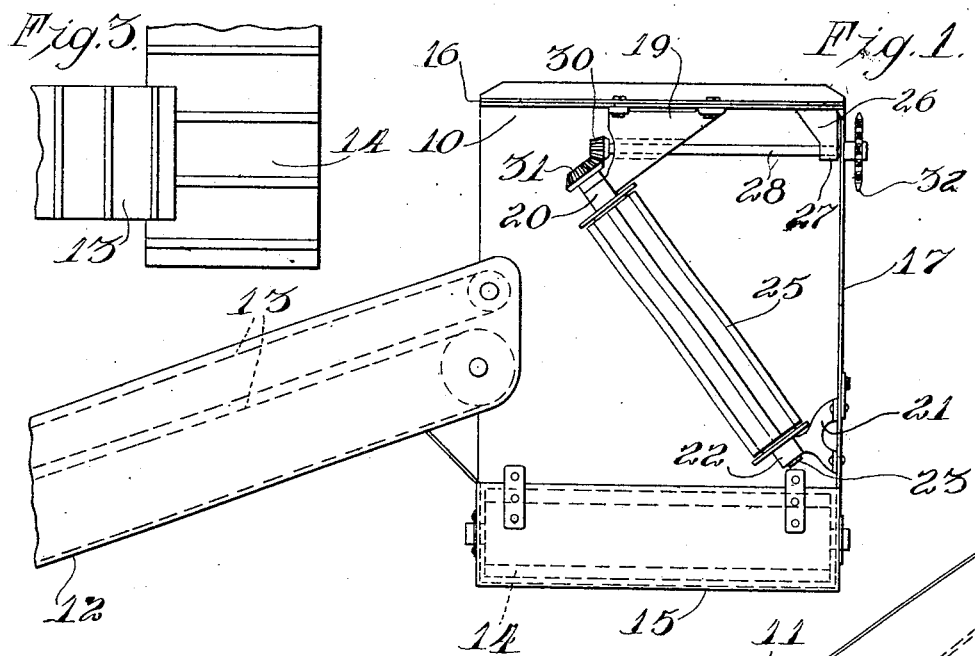
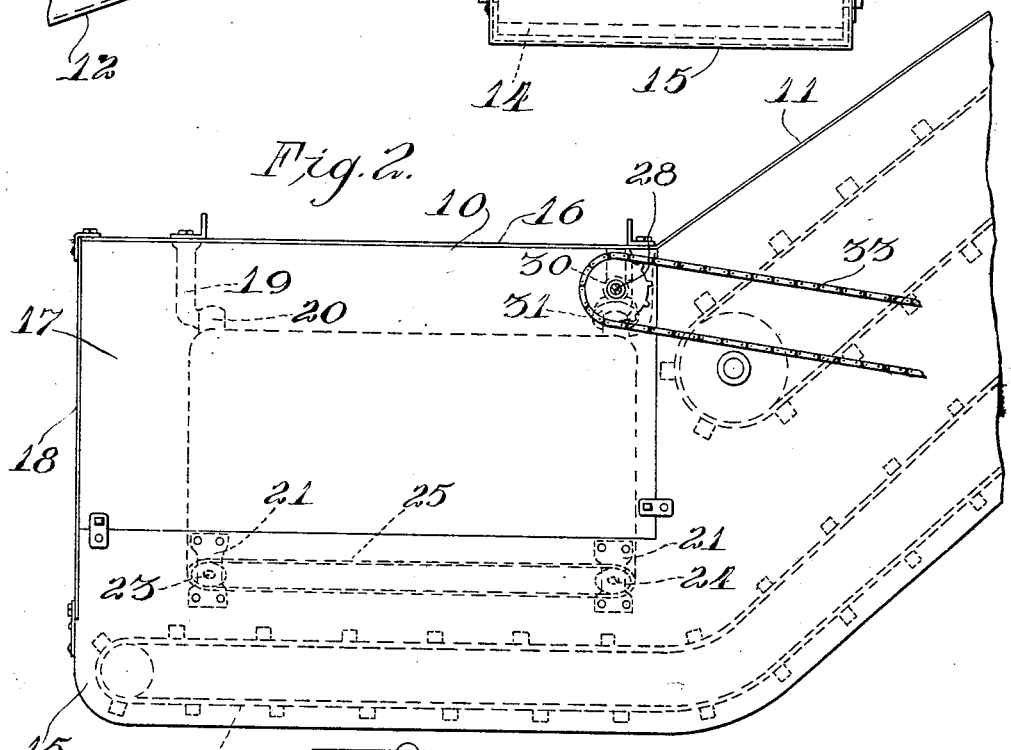
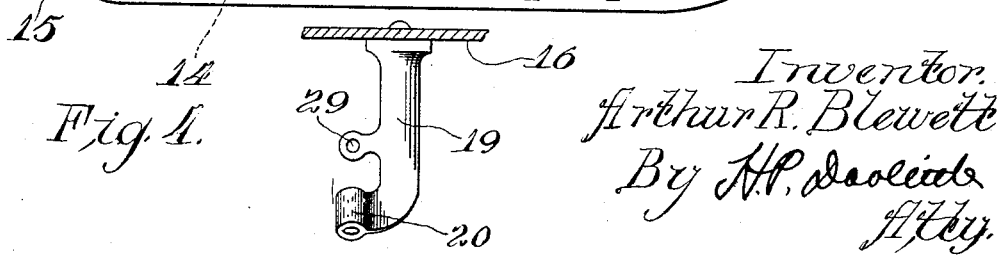

Patented Dec. 24, 1929

1,740,723

UNITED STATES PATENT OFFICE

ARTHUR R. BLEWETT, OF CHICAGO, ILLINOIS, ASSIGNOR TO INTERNATIONAL HARVESTER COMPANY, A CORPORATION OF NEW JERSEY

FEEDER CONSTRUCTION FOR HARVESTER THRASHERS

Application filed March 19, 1928. Serial No. 262,661.

This invention is in a feed house construction for harvester thrashers.

Harvester thrashers as now standard in the art embody a transverse cutting and gathering platform which carries a transverse conveyer discharging to a transverse elevator spout. The material being handled, such as grain, leaves this elevated spout and drops onto a right angularly disposed, longitudinal conveyer known as the feeder. This feeder is arranged in a feed house communicating with the thrasher part of the machine in a manner to cause the feeder conveyer to convey the grain to the thrashing cylinder of the thrasher part. Objectionable bunching of the grain frequently occurs at the right angle turn between the elevator spout and feed conveyer. Such bunching interferes with efficient thrashing at the thrashing cylinder and, therefore, it is highly desirable that some positively acting means be provided to maintain an even and continuous flow of the grain into the thrasher part from the feeding mechanism.

The main purpose of this invention is to improve the feeding of grain in the combination stated.

A more particular object is to provide an improved auxiliary feed conveyer which will deflect the grain from the elevator spout by positively engaging the same to turn it in its right angular turn and then positively assisting the main feed conveyer in moving the grain to the thrashing cylinder in an even stream.

Other objects will appear to those skilled in this art as the description progresses.

Briefly, these desirable objects are achieved in the combination stated by arranging an auxiliary, longitudinally running conveyer above the main feed conveyer, said auxiliary conveyer being inclined so it will best engage the grain coming from the spout to deflect the same.

In the accompanying sheet of drawings showing an illustrative embodiment of the invention,—

Figure 1 is a front elevational view with the upper, front wall of the feed house removed to show the inclined auxiliary conveyer;

Figure 2 is a side elevational view;

Figure 3 is a diagrammatic plan view to illustrate the right angular relationship between the elevator spout and main feeder conveyer; and Figure 4 is a side detail view of a casting.

Only so much of the harvester thrasher is shown as will be necessary to illustrate the invention. The longitudinally arranged feed house is generally shown at 10, the elevator housing 11 being arranged rearwardly thereof and leading to a thrasher cylinder in the thrasher part of the harvester thrasher. These latter parts are not shown. A transverse elevator spout frame is shown at 12. It will be understood that the platform conveyer (not shown) delivers the cut grain to this spout frame, there being elevator conveyers 13 conventionally arranged in the spout frame to discharge the grain into the open, left hand side of the feed house 10. The grain falls onto a right angularly disposed, longitudinally running feeder conveyer 14 arranged in the bottom of the feed house, said conveyer continuing up in the inclined frame 11 to the thrashing cylinder, as will be understood.

The bottom of the feed house includes a lower section 15 covered by a roof section 16 including a roof part, a back wall and front wall, as is usual in this art. The back wall includes a removable door part 17, and the front wall includes another removable door part 18.

The roof of the feed house carries front and rear depending hanger brackets 19, each provided with an inclined journal sleeve 20. The lower portion of the feed house back wall carries corresponding front and rear brackets 21, each provided with an inclined journal sleeve 22. In the sleeves of the front brackets is journaled an inclined idler shaft 23, and in the sleeves of the rear brackets is journaled a driven, inclined shaft 24. Trained around these two shafts is an inclined, endless, longitudinally running, slatted conveyer 25. This conveyer is inclined to that position where it can, to the best advantage, efficiently and aggressively engage the grain discharged into the feed house from the spout elevators 13 and act to deflect and turn said grain stream evenly and continuously back in cooperation with the main feeder conveyer 14, to feed the grain to the thrashing cylinder.

The roof of the feed house carries another depending bracket at 26 formed with a journal 27 to receive a transverse shaft 28. The other end of this shaft is carried in a sleeve 29 formed with the rear hanger bracket 19. (See Figure 4.) The inner end of the shaft carries a bevel gear 30 which is in mesh with a bevel pinion 31 on the driven shaft 24. The opposite, or outer end of the transverse shaft 28 projects through the back wall of the feed house, where it carries a sprocket wheel 32 designed for connection with a chain 33, which chain obviously can be connected to receive motion from any suitable moving part of the harvester thrasher, not shown.

In operation, the inclined, auxiliary conveyer 25 is driven from the shaft 28 so that the run of the conveyer facing the discharge of grain from the spout will move in the direction of the thrashing cylinder. The conveyer, due to its inclination, acts to deflect and bend the grain stream rearwardly from the transverse course it followed in coming from the spout. Therefore, it is impossible for the grain to fluff or bunch up at the turn and, as a result, the grain is kept moving around the turn and back to the cylinder in an even, steady stream. In the event it becomes necessary to alter the tension of the conveyers in the feeder house, or if inspection of the interior of said house becomes necessary, it is merely required to remove either the back wall door 17 or the front wall door 18.

The auxiliary feeder and deflector conveyer 25 operates, as shown, in an inclined, oblique position tilted on one side edge, and forms with the horizontal feeder conveyer 14 an acute angle passage-way into which the grain from the spout 13 is discharged. This disposition, relatively, of the main and auxiliary feeder conveyers forms an acute angled passage-way that receives the grain from the transverse, or right angularly disposed header conveyer and spout.

From the above detailed description it can now be appreciated that an improved feed house construction for harvester thrashers has been provided which accomplishes all of the desirable objects of the invention heretofore recited.

It is the intention to cover all such changes and variations in arrangement of parts as do not materially depart from the spirit and scope of this invention, as is indicated by the following claims.

What is claimed is:

1. In a feeder construction for harvester thrashers, a longitudinally disposed feeder house open at one side, a main feeder conveyer running lengthwise of the house and disposed in the bottom thereof, an auxiliary feeder conveyer running lengthwise of the house and tilted obliquely upwardly on one side edge, adjacent side edges of the main and auxiliary conveyers forming an acute angled feeder passage-way, and a transversely disposed conveyer discharging material into said passage-way through the open side of the house.

2. In a feeder construction for harvester thrashers, a longitudinally disposed feeder house open at one side, a main feeder conveyer running lengthwise of the house and disposed in the bottom thereof, an auxiliary feeder conveyer running lengthwise of the house and tilted obliquely upwardly on one side edge to overhang the main feeder conveyer, adjacent side edges of the main and auxiliary feeder conveyers forming an acute angled feeder passage-way, a transversely disposed conveyer discharging material into said passage-way through the open side of the house, and a removable door for the house on the side opposite the open side.

3. An arrangement of feeder conveyers for a harvester thrasher, said arrangement comprising a pair of longitudinally running feeder conveyers each disposed with a side edge proximately to form an acute angled passage-way, and a right angularly disposed conveyer discharging material into the open side of said passage-way.

In testimony whereof I affix my signature.

ARTHUR R. BLEWETT.